(12) United States Patent
Fujiwara

(10) Patent No.: US 6,643,129 B2
(45) Date of Patent: Nov. 4, 2003

(54) COOLING UNIT INCLUDING FAN AND PLURALITY OF AIR PATHS AND ELECTRONIC APPARATUS INCLUDING THE COOLING UNIT

(75) Inventor: Nobuto Fujiwara, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/187,625

(22) Filed: Jul. 3, 2002

(65) Prior Publication Data

US 2003/0007327 A1 Jan. 9, 2003

(30) Foreign Application Priority Data

Jul. 5, 2001 (JP) .......................................... 2001-204888

(51) Int. Cl.[7] ................................................ H05H 7/20
(52) U.S. Cl. ...................... 361/687; 165/80.3; 165/121; 165/104.33; 257/722; 454/184; 361/645; 361/697; 361/703
(58) Field of Search .................. 165/80.3, 121, 165/126, 104.33, 185; 257/722; 361/687, 690, 694–697, 700–704, 707, 715; 454/184; 62/259.2

(56) References Cited

U.S. PATENT DOCUMENTS

| | | | | |
|---|---|---|---|---|
| 5,816,319 A | * | 10/1998 | Kamekawa et al. | 165/121 |
| 5,867,365 A | * | 2/1999 | Chiou | 361/697 |
| 6,111,748 A | * | 8/2000 | Bhatia | 361/695 |
| 6,333,852 B1 | * | 12/2001 | Lin | 361/697 |
| 6,348,748 B1 | * | 2/2002 | Yamamoto | 361/697 |

FOREIGN PATENT DOCUMENTS

| | | |
|---|---|---|
| JP | 8--321571 | 12/1996 |
| JP | 2000-73996 | 3/2000 |

* cited by examiner

*Primary Examiner*—Gregory Thompson
(74) *Attorney, Agent, or Firm*—Finnegan, Henderson, Farabow, Garrett & Dunner, L.L.P.

(57) ABSTRACT

A cooling unit having a fan and a heat sink thermally connected to a heat generating component. The heat sink includes a receptacle in which the fan is contained, a plurality of air paths which are arranged to surround an outer peripheral portion of the fan, and through which the air exhausted from the outer peripheral portion flows, and at least one partition which divides the respective air paths into a plurality of regions. The partition extends toward a downstream of the air paths from the outer peripheral portion of the fan.

21 Claims, 4 Drawing Sheets

COOLING UNIT INCLUDING FAN AND PLURALITY OF AIR PATHS AND ELECTRONIC APPARATUS INCLUDING THE COOLING UNIT

CROSS REFERENCE TO RELATED APPLICATIONS

This application is based upon and claims the benefit of priority from the prior Japanese Patent Application No. 2001-204888, filed Jul. 5, 2001, the entire contents of which are incorporated herein by reference.

BACKGROUND OF THE INVENTION

1. Field of the Invention

The present invention relates to a cooling unit for cooling heat generating components such as a semiconductor package and an electronic apparatus on which the cooling unit is mounted.

2. Description of the Related Art

For microprocessors for use in electronic apparatuses such as a portable computer, a heating value increases by an increase of a processing speed or an increase of functions. Therefore, a conventional electronic apparatus includes a cooling unit for forcibly cooling the microprocessor. One example of the conventional cooling unit is disclosed in "Jpn. Pat. Appln. KOKAI Publication No. 8-321571". The cooling unit includes a heat sink thermally connected to the microprocessor, and an electromotive fan incorporated in the heat sink.

The heat sink includes one air path through which air flows, an inlet positioned in an upstream end of the air path, and an outlet positioned in a downstream end of the air path. The air path is formed in the heat sink. The inlet is opened in an upper surface of the heat sink. The outlet is opened only in one side surface of the heat sink.

The electromotive fan includes an impeller. The impeller is disposed in the air path. When the impeller rotates, air is sucked into a rotation center portion of the impeller from the inlet, and the air is exhausted to the air path from an outer peripheral portion of the impeller by a centrifugal force. The air exhausted to the air path flows toward the outlet through the air path, and cools the heat sink in a flowing process. The air warmed by heat exchange with the heat sink is exhausted to the outside of the heat sink from the outlet.

In the conventional cooling unit, the air flowing through the air path in the heat sink functions as a major cooling medium to draw heat from the microprocessor. Therefore, a cooling capability of the microprocessor mainly depends on a flow rate of air which flows through the air path.

Additionally, according to the above-described conventional cooling unit, there is only one outlet for exhausting air, and the impeller is positioned in an end of the air path disposed opposite to the outlet. Therefore, a range extending substantially over the half of the outer peripheral portion of the impeller is disposed opposite to the inner surface of the air path. The exhaust of the air from the outer peripheral portion of the impeller is hindered by the inner surface of the air path. In other words, the air sucked into the rotation center portion of the impeller is exhausted to the air path from a partial range of the outer peripheral portion of the impeller, and the air cannot efficiently be exhausted from the entire periphery of the outer peripheral portion of the impeller.

Therefore, the flow rate of the air flowing through the air path cannot sufficiently be secured, and a problem occurs that the cooling capability of the microprocessor becomes insufficient.

BRIEF SUMMARY OF THE INVENTION

An object of the present invention is to provide a cooling unit which can increase a flow rate of air flowing through an air path, and efficiently cool a heat generating component.

Another object of the present invention is to provide an electronic apparatus on which the cooling unit is mounted.

To achieve the above-described objects, according to a first aspect of the present invention, there is provided a cooling unit comprising: a fan having an outer peripheral portion for exhausting air; and a heat sink thermally connected to a heat generating component. The heat sink includes: a receptacle in which the fan is contained; a plurality of air paths which are arranged to surround the outer peripheral portion of the fan, and through which the air exhausted from the fan flows; and at least one partition which divides each air path into a plurality of regions. The partition extends toward a downstream of the air path from the outer peripheral portion of the fan.

According to the constitution, the flow of the air exhausted from the outer peripheral portion of the fan is not interrupted, and a flow direction of the air is not restricted to one. Additionally, since the air exhausted from the outer peripheral portion of the fan is guided by the partition and fed into the air path, the flow of air flowing through the air path is adjusted. Therefore, the air exhausted from the outer peripheral portion of the fan can efficiently be fed into the air path, and the flow rate of the air flowing through the air path increases.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A portable computer to which a first embodiment of the present invention is applied will be described hereinafter with reference to FIGS. 1 to 4.

Figure 1:
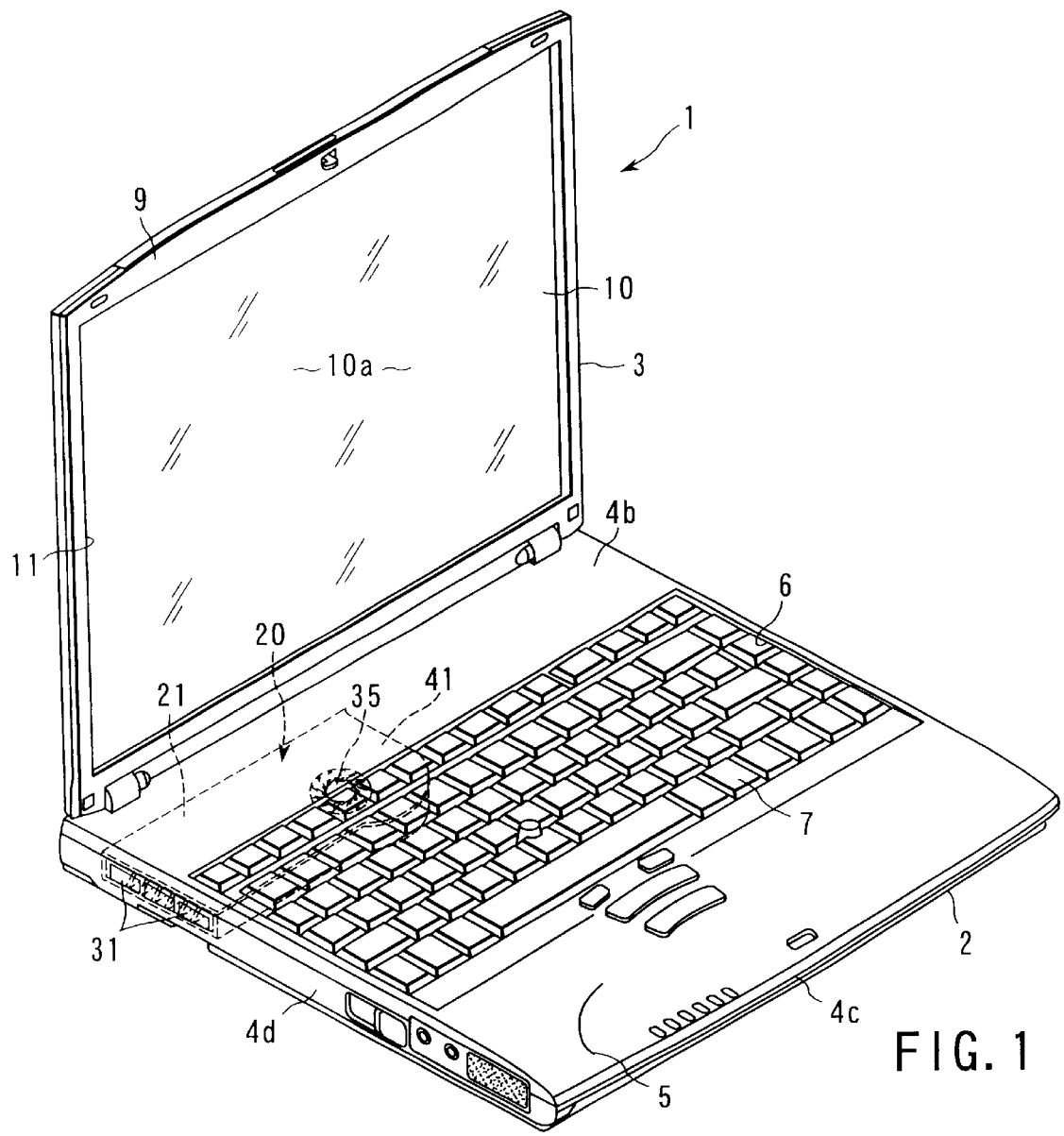
FIG. 1 is a perspective view of a portable computer according to a first embodiment of the present invention.

FIG. 1 shows a portable computer 1 as an electronic apparatus. The portable computer 1 comprises a computer main body 2 and a display unit 3 supported by the main body 2.

The main body 2 includes a housing 4. The housing 4 has a flat box shape including a bottom wall 4a, upper wall 4b, front wall 4c, and left and right side walls 4d, and rear wall 4e. The upper wall 4b of the housing 4 has a palm rest 5 and keyboard attaching portion 6. The palm rest 5 is positioned in a front end of the housing 4. The keyboard attaching portion 6 is positioned behind the palm rest 5. A keyboard 7 is disposed in the keyboard attaching portion 6.

The display unit 3 includes a display housing 9 and a liquid crystal display panel 10 contained in the display housing 9. The display housing 9 is connected to a rear end of the housing 4 via a hinge (not shown) so that the housing can rotate. The liquid crystal display panel 10 has a display screen 10a for displaying an image. The display screen 10a is exposed to the outside via an opening 11 formed in a front surface of the display housing 9.

Figure 3:
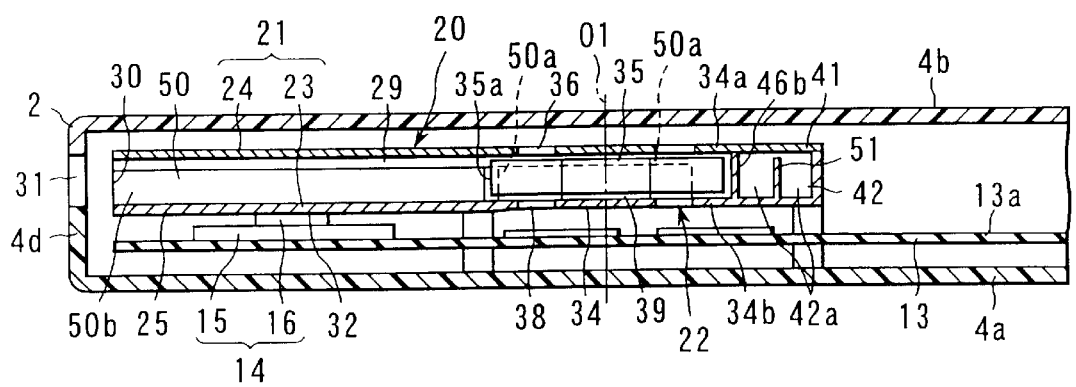
FIG. 3 is a sectional view taken along a line F3—F3 of FIG. 2.
Figure 2:
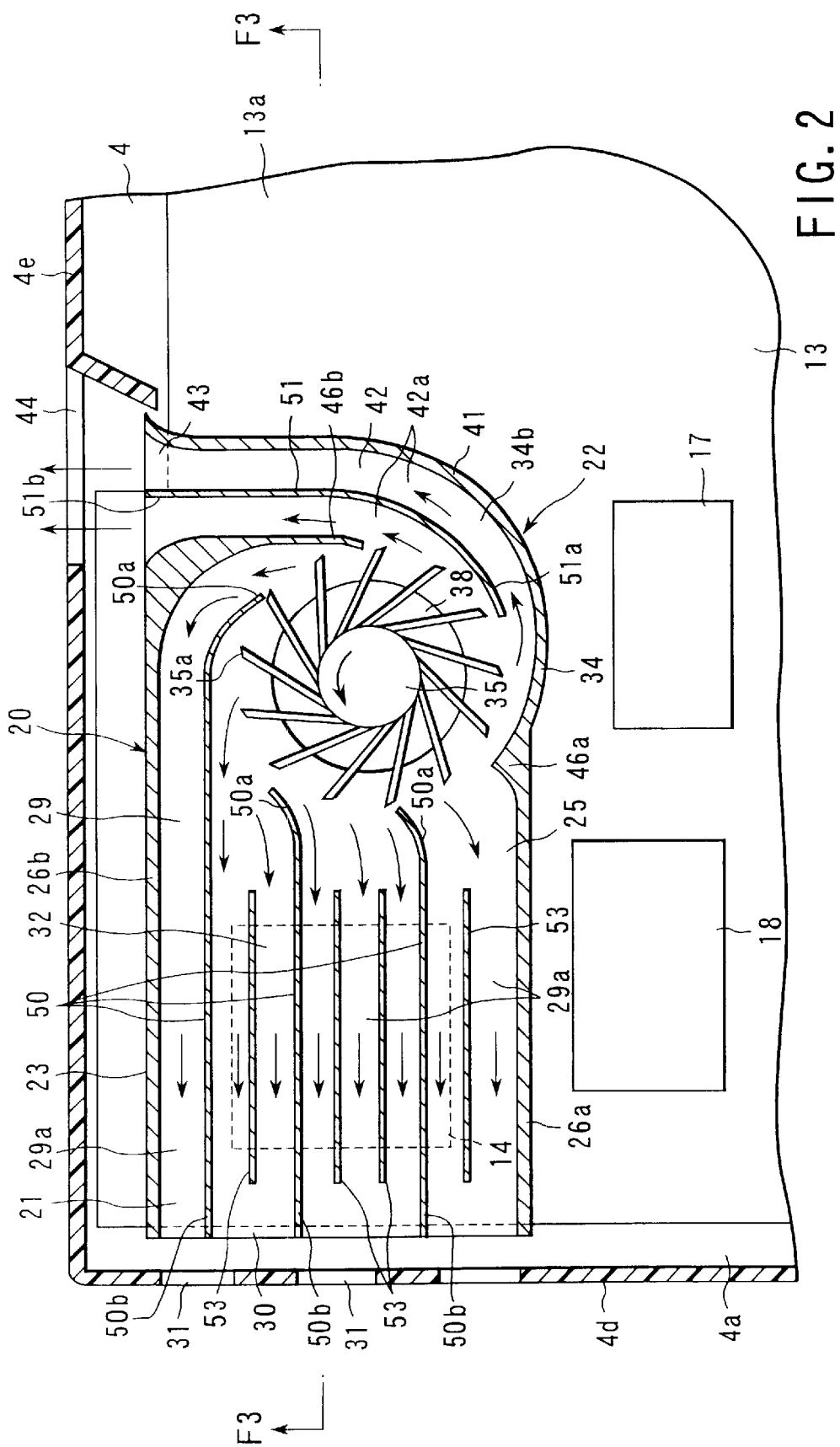
FIG. 2 is a sectional view of the portable computer showing a positional relation between a fan and first and second air paths in the first embodiment of the present invention.

As shown in FIGS. 2 and 3, the housing 4 contains a printed wiring board 13. The printed wiring board 13 is disposed in parallel to the bottom wall 4a of the housing 4. The printed wiring board 13 has an upper surface 13a disposed opposite to the upper wall 4b of the housing 4 and the keyboard 7. A semiconductor package 14, power unit 17 and chip set 18 are mounted on the upper surface 13a of the printed wiring board 13.

The semiconductor package 14 constitutes a heat generating component, and is positioned in a left end of a rear portion of the housing 4. The semiconductor package 14 includes a base board 15 and an IC chip 16 soldered to an upper surface of the base board 15. The IC chip 16 has a very large amount of heat generated during an operation, and needs to be cooled in order to maintain a stable operation.

Furthermore, the housing 4 contains a cooling unit 20. The cooling unit 20 includes a heat sink 21 and electromotive fan 22. The heat sink 21 and electromotive fan 22 are formed to be integral with each other, and positioned in a corner defined by the left side wall 4d and rear wall 4e of the housing 4.

The heat sink 21 is constituted of a metal material superior in heat conductivity, such as an aluminum alloy. The heat sink 21 has a flat box shape extending in a width direction of the housing 4. The heat sink 21 is constituted of a base 23 and top plate 24. The base 23 has a bottom plate 25, and side plates 26a and 26b rising from front and rear edges of the bottom plate 25. The top plate 24 is fixed over the upper ends of the side plates 26a and 26b, and disposed opposite to the bottom plate 25.

A first air path 29 is formed between the base 23 and top plate 24. The first air path 29 extends in the width direction of the housing 4, and has a first outlet 30 in a downstream end thereof. The first outlet 30 is disposed opposite to first exhaust ports 31 formed in the left side wall 4d of the housing 4.

The base 23 of the heat sink 21 is fixed to the upper surface 13a of the printed wiring board 13. The bottom plate 25 of the base 23 is disposed opposite to the upper surface 13a of the printed wiring board 13. A lower surface of the bottom plate 25 forms a flat heat receiving section 32. The heat receiving section 32 is disposed in a position opposite to the first air path 29. The heat receiving section 32 is thermally connected to the IC chip 16 of the semiconductor package 14.

Figure 4:
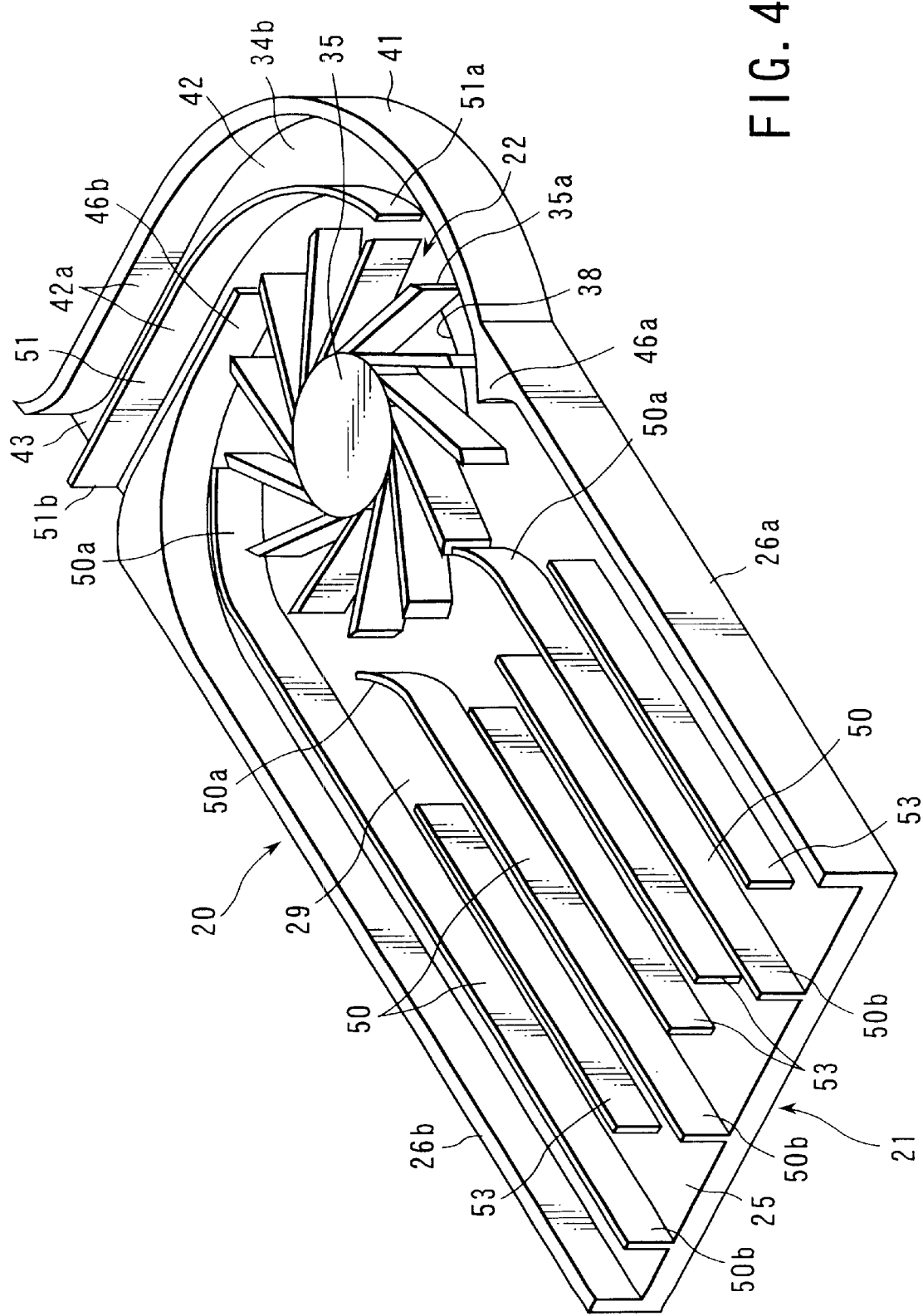
FIG. 4 is a perspective view of a cooling unit showing a positional relation among the fan, first and second air paths, and first and second partitions in the first embodiment of the present invention.

As shown in FIGS. 2 to 4, the heat sink 21 includes a casing portion 34 as a receptacle. The casing portion 34 has a hollow box shape, and includes an upper surface 34a and bottom surface 34b. The upper surface 34a of the casing portion 34 is connected to the top plate 24 of the heat sink 21. The bottom surface 34b of the casing portion 34 is connected to the base 23 of the heat sink 21. Therefore, the casing portion 34 is aligned with the first air path 29, and the upstream end of the first air path 29 is opened in the casing portion 34.

The casing portion 34 includes first and second inlets 36 and 38. The first inlet 36 is opened in the upper surface 34a of the casing portion 34. The second inlet 38 is opened in the bottom surface 34b of the casing portion 34. The second inlet 38 is positioned right under the first inlet 36.

The electromotive fan 22 includes a centrifugal impeller 35. The impeller 35 is contained in the casing portion 34 in a posture in which a rotation axial line O1 is vertically disposed. The impeller 35 is disposed between the first inlet 36 and second inlet 38, and positioned in the upstream end of the first air path 29. The impeller 35 is rotated by a flat motor 39, when the temperature of the semiconductor package 14 reaches a predetermined value. When the impeller 35 rotates, the air in the housing 4 is sucked into the rotation center portion of the impeller 35 through the first and second inlets 36 and 38. The air is exhausted into the casing portion 34 from an outer peripheral portion 35a of the impeller 35 by a centrifugal force.

As shown in FIGS. 2 to 4, the casing portion 34 of the heat sink 21 has a hollow extending portion 41. The extending portion 41 juts out on a side opposite to the first air path 29. A second air path 42 is formed in the extending portion 41. The second air path 42 is positioned on a side opposite to the first air path 29 with respect to the impeller 35. Therefore, the impeller 35 is positioned between the first air path 29 and the second air path 42. The second air path 42 extends in a direction intersecting with the first air path 29. Concretely, the second air path 42 extends to the rear of the housing 4, and the upstream end thereof is opened in the casing portion 34. Furthermore, the second air path 42 has a second outlet 43 in the downstream end thereof. The second outlet 43 is disposed opposite to a second exhaust port 44 formed in the rear wall 4e of the housing 4.

As shown in FIGS. 2 and 4, the casing portion 34 includes first and second guide walls 46a and 46b in an inner surface thereof. The first guide wall 46a juts out to the outer peripheral portion 35a of the impeller 35 from a position corresponding to the front side wall 26a of the heat sink 21. A tip end of the first guide wall 46a is adjacent to the outer peripheral portion 35a of the impeller 35. The second guide wall 46b juts out to the outer peripheral portion 35a of the impeller 35 from a position corresponding to the rear side wall 26b of the heat sink 21, and is disposed between the second air path 42 and the outer peripheral portion 35a of the impeller 35. A tip end of the second guide wall 46b is adjacent to the outer peripheral portion 35a of the impeller 35.

Therefore, the tip ends of the first and second guide walls 46a and 46b are kept in a positional relation in which the tip ends are disposed opposite to each other via the impeller 35. Therefore, the first and second guide walls 46a and 46b are positioned in a boundary portion between the upstream ends of the first and second air paths 29 and 42.

Thereby, a part of the outer peripheral portion 35a of the impeller 35 is exposed to the upstream end of the first air path 29, and a remaining portion thereof is exposed to the upstream end of the second air path 42. In other words, the upstream ends of the first and second air paths 29 and 42 are disposed to surround the outer peripheral portion 35a of the impeller 35. As a result, the air exhausted from the outer peripheral portion 35a of the impeller 35 is distributed to the upstream ends of the first and second air paths 29 and 42 by the first and second guide walls 46a and 46b.

As shown in FIG. 2, the first air path 29 is divided into a plurality of regions 29a by a plurality of first partitions 50. The first partitions 50 rise from the upper surface of the bottom plate 25 of the base 23. The first partitions 50 extend in the width direction of the housing 4, and are arranged at intervals in parallel to one another. One of the first partitions 50 disposed opposite to the rear side wall 26b of the heat sink 21 extends to turn to the back of the impeller 35.

The respective first partitions 50 extend toward the first outlet 30 in the downstream end of the first air path 29 from the outer peripheral portion 35a of the impeller 35. Each first partition 50 includes one end 50a disposed opposite to the outer peripheral portion 35a of the impeller 35, and the other end 50b disposed opposite to the first outlet 30. One ends 50a of the first partitions 50 are bent in a circular arc shape, and smoothly guides the air exhausted from the outer peripheral portion 35a of the impeller 35 into the first air path 29.

The second air path 42 is partitioned into two regions 42a by a single second partition 51. The second partition 51 rises from the bottom surface 34b of the extending portion 41 of the casing portion 34. The second partition 51 extends toward the second outlet 43 in the downstream end of the second air path 42 from the outer peripheral portion 35a of the impeller 35. The second partition 51 includes one end 51a disposed opposite to the outer peripheral portion 35a of the impeller 35, and the other end 51b positioned in the second outlet 43. One end 51a of the second partition 51 is bent in a circular arc shape so as to extend along the outer peripheral portion 35a of the impeller 35, and smoothly guides the air exhausted from the outer peripheral portion 35a of the impeller 35 into the second air path 42.

Furthermore, one ends 50a of the first partitions 50 and one end 51a of the second partition 51 are arranged at an interval in a rotation direction of the impeller 35 so as to surround the outer peripheral portion 35a of the impeller 35.

As shown in FIGS. 2 and 4, the heat sink 21 has a plurality of radiating fins 53 exposed to the first air path 29. The radiating fins 53 are formed integrally in the upper surface of the bottom plate 25 of the base 23. Each radiating fin 53 is disposed between the first partitions 50 disposed adjacent to each other. The radiating fins are disposed at intervals in parallel to one another. The radiating fins 53 are positioned right above the heat receiving section 32. A length of the radiating fin 53 is smaller than that of the first partitions 50.

In this constitution, the IC chip 16 of the semiconductor package 14 generates heat during the operation of the portable computer 1. The heat of the IC chip 16 is conducted to the heat receiving section 32 of the heat sink 21, and subsequently diffused in the base 23 and top plate 24 by heat conduction.

When the temperature of the semiconductor package 14 reaches the predetermined value, the impeller 35 of the electromotive fan 22 rotates. Thereby, the air inside the housing 4 is sucked into the rotation center portion of the impeller 35 through the first and second inlets 36 and 38 of the casing portion 34. The sucked air is exhausted into the casing portion 34 from the outer peripheral portion 35a of the impeller 35 by the centrifugal force.

In this case, the heat sink 21 includes first and second air paths 29 and 42, and the upstream ends of the first and second air paths 29 and 42 are arranged to surround the outer peripheral portion 35a of the impeller 35. Therefore, the outer peripheral portion 35a of the impeller 35 is opened broadly over the entire periphery, so that the flow of the air exhausted from the outer peripheral portion 35a of the impeller 35 is not hindered by the casing portion 34, and an exhaust direction of air is not regulated.

The air exhausted from the outer peripheral portion 35a of the impeller 35 is distributed to the upstream ends of the first and second air paths 29 and 42 by the first and second guide walls 46a and 46b. These first and second air paths 29 and 42 are divided into a plurality of regions 29a and 42a by the first and second partitions 50 and 51. One end 50a of the partitions 50 and one end 51a of the partition 51 are disposed opposite to the outer peripheral portion 35a of the impeller 35.

Therefore, the air exhausted from the outer peripheral portion 35a of the impeller 35 is fed into the upstream ends of the first and second air paths 29 and 42. Since the other ends 50b of the partitions 50 and the other end 51b of the partition 51 reach the first and second outlets 30 and 43, the flow of air passed through the respective regions 29a and 42a of the first and second air paths 29 and 42 is adjusted by the partitions 50 and 51. Thereby, the air smoothly flows through the first and second air paths 29 and 42 and reaches the first and second outlets 30 and 42.

As shown by arrows in FIG. 2, the air flowing through the first air path 29 is passed among the radiating fins 53, and cools the heat sink 21 having received the heat of the IC chip 16 in the flowing process. The heat of the IC chip 16 conducted to the heat sink 21 is taken away by the heat exchange with the air. The air warmed by the heat exchange is exhausted to the outside of the housing 4 from the first outlet 30 of the first air path 29 through the first exhaust ports 31.

Furthermore, the heat of the IC chip 16 is conducted to the extending portion 41 of the casing portion 34. The extending portion 41 is cooled by the air flowing through the second air path 42. The heat of the IC chip 16 conducted to the extending portion 41 is taken away by the heat exchange with the air flowing through the second air path 42. The air warmed by the heat exchange is exhausted to the outside of the housing 4 from the second outlet 43 of the second air path 42 through the second exhaust port 44.

According to the first embodiment of the present invention, the air exhausted from the outer peripheral portion 35a of the impeller 35 can efficiently be fed into the first and second air paths 29 and 42, and the flow rate of the air flowing through these air paths 29 and 42 increases. As a result, the heat can efficiently be exchanged between the heat sink 21 and air, and the cooling capability of the semiconductor package 14 increases. Therefore, even in a use mode in which the semiconductor package 14 is driven at a maximum capability, the operation environmental temperature of the semiconductor package 14 can appropriately be kept.

Furthermore, according to the above-described constitution, since the amount of air exhausted from the outer peripheral portion 35a of the impeller 35 increases, the amount of air sucked into the rotation center portion of the impeller 35 through the first and second inlets 36 and 38 increases. Therefore, the air inside the housing 4 easily flows toward the first and second inlets 36 and 38, and ventilation in the housing 4 is improved. Therefore, the heat of the semiconductor package 14, power unit 17 and chip set 18 is not easily accumulated in the housing 4, and the temperature in the housing 4 can be prevented from rising.

Figure 5:
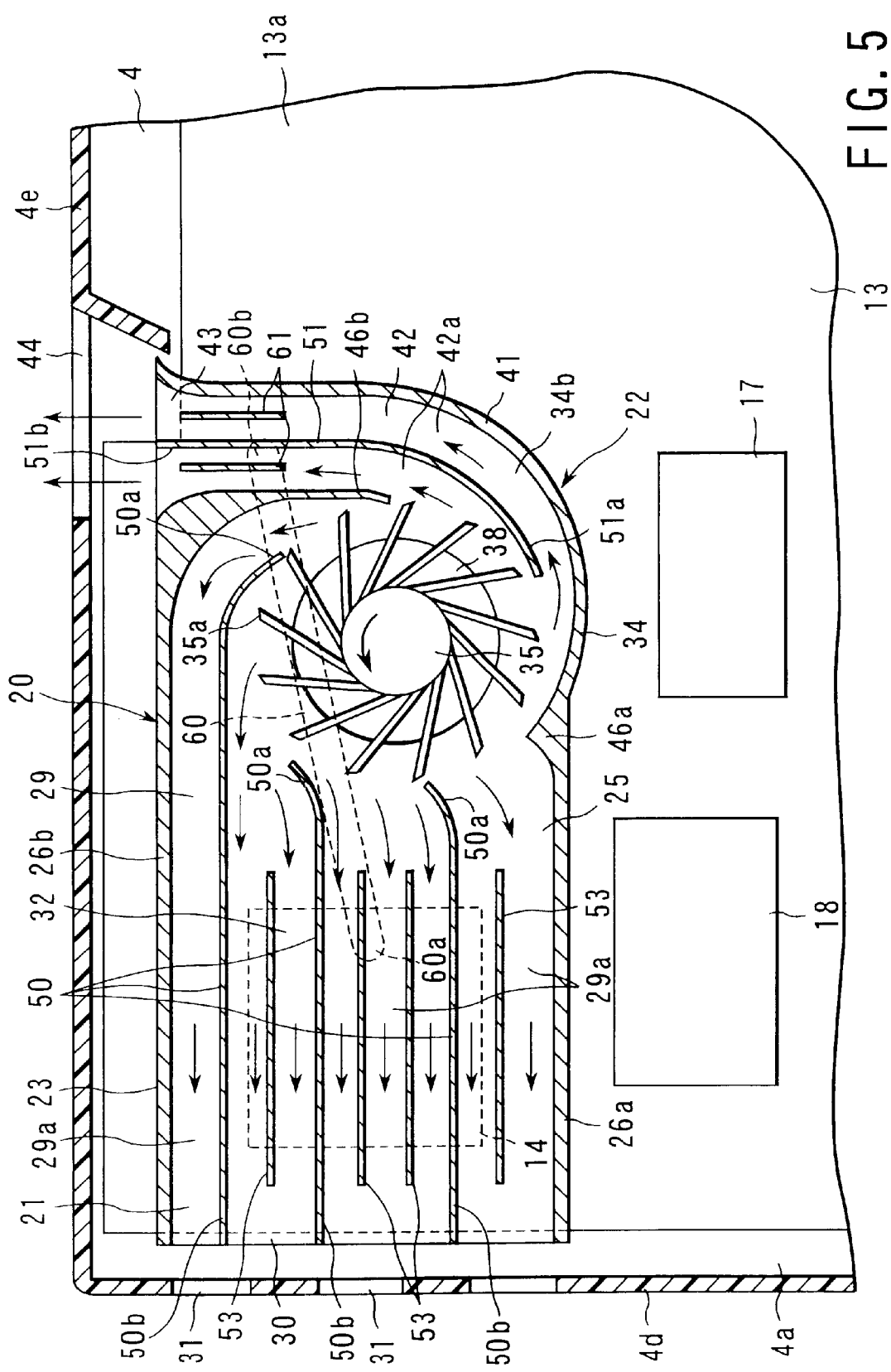
FIG. 5 is a sectional view of the portable computer showing a positional relation between the fan and first and second air paths in a second embodiment of the present invention.

Additionally, the present invention is not limited to the first embodiment. FIG. 5 shows a second embodiment of the present invention.

The second embodiment is different from the first embodiment mainly in that a heat pipe 60 as a heat transfer member is added to the heat sink 21. The other basic constitutions of the portable computer 1 are similar to those of the first embodiment. Therefore, the same constituting components as those of the first embodiment are denoted with the same reference numerals in the second embodiment, and the description thereof is omitted.

As shown in FIG. 5, the heat pipe 60 is buried in the bottom plate 25 of the base 23. One end 60a of the heat pipe 60 is thermally connected to the heat receiving section 32 of the bottom plate 25. The other end 60b of the heat pipe 60 extends beyond the electromotive fan 22 and is guided to the extending portion 41 of the casing portion 34. The other end 60b is thermally connected to the bottom surface 34b of the extending portion 41 in the vicinity of the second outlet 43.

Furthermore, the extending portion 41 has a plurality of radiating fins 61 exposed to the second air path 42. The radiating fins 61 rise from the upper surface of the bottom plate 25 of the base 23. The radiating fins 61 are arranged in parallel to one another via the second partition 51, and positioned in the vicinity of the second outlet 43.

According to the constitution, a part of the heat of the semiconductor package 14 is transferred to the extending portion 41 of the casing portion 34 from the heat receiving section 32 of the heat sink 21 through the heat pipe 60. Therefore, the heat of the semiconductor package 14 can be diffused over a broad range of the heat sink 21, and radiating properties of the heat sink 21 are more enhanced.

In addition, the heat transferred to the extending portion 41 of the casing portion 34 is taken away by the heat exchange with the air flowing through the second air path 42. In this case, since the radiating fins 53 are disposed in the second air path 42, a contact area of the air flowing through the second air path 42 with the extending portion 41 increases. Therefore, the radiating properties of the extending portion 41 are enhanced, and the heat of the semiconductor package 14 can efficiently be discharged by the air flow.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A cooling unit which cools a heat generating component, comprising:
a fan having an outer peripheral portion to exhaust air; and
a heat sink which is thermally connected to the heat generating component, the heat sink including: a receptacle in which the fan is contained; a plurality of air paths which are arranged to surround the outer peripheral portion of the fan, and through which the air exhausted from the outer peripheral portion flows; and at least one partition which divides each air path into a plurality of regions, and extends toward a downstream of the air paths from the outer peripheral portion of the fan.

2. The cooling unit according to claim 1, wherein the heat sink includes a plurality of radiating fins exposed to the air paths, and the radiating fins are disposed adjacent to the partition.

3. The cooling unit according to claim 1, wherein the partition includes one end disposed opposite to the outer peripheral portion of the fan, and one end of the partition is arranged at an interval in a rotation direction so as to surround the fan.

4. The cooling unit according to claim 3, wherein the air paths extend in directions different from each other with respect to the fan, and the heat sink includes a plurality of outlets positioned in downstream ends of the air paths.

5. The cooling unit according to claim 1, wherein the air paths include upstream ends opened in the receptacle, the upstream ends of the air paths are arranged to surround the outer peripheral portion of the fan, the receptacle includes a plurality of guide walls which move toward the outer peripheral portion of the fan, and the guide walls distribute the air exhausted from the outer peripheral portion of the fan into the respective air paths.

6. The cooling unit according to claim 1, wherein the heat sink includes a heat receiving section which receives heat of the heat generating component, and the heat receiving section is disposed in a position corresponding to any one of the air paths.

7. A cooling unit which cools a heat generating component, comprising:
a fan impeller having an outer peripheral portion to exhaust air; and
a heat sink which is thermally connected to the heat generating component, the heat sink including: a receptacle in which the fan is contained; first and second outlets opened in positions different from each other with respect to the fan; first and second air paths which extend toward the first and second outlets from the outer peripheral portion of the fan; at least one guide wall which is disposed in the receptacle, and moves toward the outer peripheral portion of the fan to distribute the air exhausted from the outer peripheral portion into the first and second air paths; and a plurality of partitions which are disposed in the first and second air paths, and extend toward the first and second outlets from the outer peripheral portion of the fan.

8. The cooling unit according to claim 7, wherein the first and second air paths include upstream ends opened in the receptacle, and the upstream ends of the first and second air paths are arranged to surround the outer peripheral portion of the fan.

9. The cooling unit according to claim 8, wherein the fan is disposed between the upstream end of the first air path and the upstream end of the second air path, and the first and second air paths extend in directions intersecting with each other.

10. The cooling unit according to claim 7, wherein the heat sink includes a heat receiving section which receives heat of the heat generating component, and the heat receiving section is disposed in a position corresponding to the first air path.

11. The cooling unit according to claim 10, wherein the heat receiving section is thermally connected to a portion of the heat sink corresponding to the second air path via a heat transfer member.

12. The cooling unit according to claim 10, wherein the heat sink includes a plurality of radiating fins exposed to the first air path.

13. The cooling unit according to claim 11, wherein the heat sink includes a plurality of radiating fins exposed to the second air path.

14. A cooling unit which cools a heat generating component, comprising:

a fan having an outer peripheral portion to exhaust air; and a heat sink which is thermally connected to the heat generating component, the heat sink including: a receptacle in which the fan is contained; first and second outlets opened in positions different from each other with respect to the receptacle; first and second air paths which connect the receptacle to the outlets, and include upstream ends disposed opposite to each other via the fan; and at least one partition which divides the first and second air paths into a plurality of regions.

15. The cooling unit according to claim 14, wherein the partition includes one end disposed opposite to the outer peripheral portion of the fan, and the other end positioned in the first and second outlets.

16. The cooling unit according to claim 14, wherein the receptacle of the heat sink includes a pair of guide walls which distribute the air exhausted from the outer peripheral portion of the fan into the first and second air paths, and the guide walls are positioned in a boundary portion between the upstream end of the first air path and the upstream end of the second air path.

17. The cooling unit according to claim 15, wherein the guide walls jut out toward the outer peripheral portion of the fan from an inner surface of the receptacle.

18. An electronic apparatus comprising:

a housing including a heat generating component; and a cooling unit which is contained in the housing, and cools the heat generating component, the cooling unit including:

a fan having an outer peripheral portion to exhaust air; and a heat sink which is thermally connected to the heat generating component, the heat sink including: a receptacle in which the fan is contained; a plurality of air paths which are arranged to surround the outer peripheral portion of the fan, and through which the air exhausted from the outer peripheral portion flows; and at least one partition which divides the air paths into a plurality of regions, and extends toward a downstream of the air paths from the outer peripheral portion of the fan.

19. The electronic apparatus according to claim 18, wherein the heat sink includes a plurality of outlets positioned in downstream ends of the plurality of air paths, and the housing includes a plurality of exhaust ports disposed opposite to the outlets.

20. The electronic apparatus according to claim 18, wherein the air paths include upstream ends opened in the receptacle, and the upstream ends of the air paths are arranged to surround the outer peripheral portion of the fan.

21. The electronic apparatus according to claim 20, wherein the partition includes one end disposed opposite to the outer peripheral portion of the fan, and one end of the partition is arranged at an interval in a rotation direction so as to surround the fan.

* * * * *